United States Patent
Ottesen et al.

(10) Patent No.: US 6,657,809 B2
(45) Date of Patent: Dec. 2, 2003

(54) METHOD AND APPARATUS FOR POSITIONING A TRANSDUCER USING A PHASE DIFFERENCE IN SURFACE PROFILE VARIATIONS ON A STORAGE MEDIUM

(75) Inventors: Hal Hjalmar Ottesen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 09/772,654

(22) Filed: Jan. 29, 2001

(65) Prior Publication Data

US 2002/0101680 A1 Aug. 1, 2002

(51) Int. Cl.[7] .......................... G11B 5/596; G11B 21/02
(52) U.S. Cl. ....................................... 360/77.03; 360/75
(58) Field of Search .......................... 360/77.02, 77.03, 360/75, 78.11, 135, 29, 65, 66; 369/275.4

(56) References Cited

U.S. PATENT DOCUMENTS

| | | | |
|---|---|---|---|
| 4,961,123 A | * 10/1990 | Williams et al. | 360/131 |
| 5,067,039 A | * 11/1991 | Godwin et al. | 360/135 |
| 5,251,082 A | 10/1993 | Elliott et al. | 360/98.07 |
| 5,283,773 A | * 2/1994 | Thomas et al. | 369/44.26 |
| 5,325,244 A | * 6/1994 | Takano et al. | 360/77.03 |
| 5,739,972 A | 4/1998 | Smith et al. | 360/77.03 |
| 5,751,510 A | 5/1998 | Smith et al. | 360/67 |
| 5,838,514 A | 11/1998 | Smith et al. | 360/75 |
| 5,872,676 A | 2/1999 | Smith et al. | 360/77.03 |
| 5,999,360 A | * 12/1999 | Meyer et al. | 360/77.02 |
| 6,084,754 A | 7/2000 | Smith et al. | 360/135 |
| 6,088,176 A | 7/2000 | Smith et al. | 360/46 |

FOREIGN PATENT DOCUMENTS

JP          04-278216          * 10/1992

OTHER PUBLICATIONS

Tanaka et al., Characterization of Magnetizing Process for Pre-Embossed Servo Pattern of Plastic Hard Disks, I.E.E.E. Transactions on Magnetics 4209 (vol. 30, No. 2, Nov. 1994).

* cited by examiner

Primary Examiner—Andrew L. Sniezek
(74) Attorney, Agent, or Firm—Matthew J. Bussan; James R. Nock (57) ABSTRACT

A method and apparatus for positioning a transducer relative to a storage medium in a storage device. The storage medium is moved relative to the transducer by a motor at a rated storage medium velocity. The storage medium has a plurality of tracks, each having a first edge and a second edge. The first edge and the second edge respectively comprise surface profile variations having a temporal frequency at the rated storage medium velocity. The surface profile variations of the first and second edges are phase modulated, i.e., have a phase difference relative to one another. First and second responses, e.g., thermal responses, are respectively induced in the transducer by the phase modulated surface profile variations of the first and second edges. The transducer may be positioned by a controller, for example, based on at least one of the first and second thermal responses. A storage medium having phase modulated surface profile variations is relatively easy to fabricate. Moreover, relatively simple servo electronics can be used with the phase modulated surface profile variations.

4 Claims, 9 Drawing Sheets

METHOD AND APPARATUS FOR POSITIONING A TRANSDUCER USING A PHASE DIFFERENCE IN SURFACE PROFILE VARIATIONS ON A STORAGE MEDIUM

CROSS-REFERENCE TO RELATED APPLICATION

This patent application is related to IBM Docket No.: ROC9-2000-0211-US1, filed concurrently, entitled "Storage Disk having Surface Profile Variations Patterned to Reduce Airbearing Modulation", which is assigned to the assignee of the instant application.

FIELD OF THE INVENTION

The present invention relates in general to data storage systems. In particular, the present invention relates to a method and apparatus for positioning a transducer using a phase difference in surface profile variations on a storage medium.

BACKGROUND

A typical magnetic data storage system includes a magnetic medium for storing data in magnetic form and a transducer used to write and read magnetic data respectively to and from the medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

The actuator assembly typically includes a coil assembly and a plurality of outwardly extending arms having flexible suspensions with one or more transducers and slider bodies being mounted on the suspensions. The suspensions are interleaved within the stack of rotating disks, typically using an arm assembly (E-block) mounted to the actuator assembly. The coil assembly, typically a voice coil motor (VCM), is also mounted to the actuator assembly diametrically opposite the actuator arms. The coil assembly generally interacts with a permanent magnet structure, and is responsive to a transducer positioning controller.

In a typical digital magnetic data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One of the information fields is typically designated for storing data, while other fields contain track and sector identification and synchronization information, for example. Data is transferred to, and retrieved from, specified track and sector locations by the transducers which follow a given track and may move from track to track, typically under servo control of a position controller.

The head slider body is typically designed as an aerodynamic lifting body that lifts the transducer off the surface of the disk as the rate of spindle motor rotation increases, and causes the transducer to hover above the disk on an airbearing cushion produced by high speed disk rotation. The separation distance between the transducer and the disk, typically 0.1 microns or less, is commonly referred to as head-to-disk spacing.

Writing data to a data storage disk generally involves passing a current through the write element of the transducer to produce magnetic lines of flux which magnetize a specific location of the disk surface. Reading data from a specified disk location is typically accomplished by a read element of the transducer sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Conventional data storage systems generally employ a closed-loop servo control system to move the actuator arms to position the read/write transducers to specified storage locations on the data storage disk. During normal data storage system operation, a servo transducer, generally mounted proximate the read/write transducers, or, alternatively, incorporated as the read element of the transducer, is typically employed to read servo information for the purpose of following a specified track (track following) and seeking specified track and data sector locations on the disk (track seeking).

A servo writing procedure is typically implemented to initially prerecord servo pattern information on the surface of one or more of the data storage disks. A servo writer assembly is typically used by manufacturers of data storage systems to facilitate the transfer of servo pattern data to one or more data storage disks during the manufacturing process.

In one known servo technique, embedded servo pattern information is written to the disk along segments extending in a direction generally outward from the center of the disk. The embedded servo pattern is thus formed between the data storing sectors of each track. It is noted that a servo sector typically contains a pattern of data, often termed a servo burst pattern, used to maintain alignment of the read/write transducers over the centerline of a track when reading and writing data to specified data sectors on the track. The servo information may also include sector and track identification codes which are used to identify the position of the transducer. The embedded servo technique offers significantly higher track densities than dedicated servo, in which servo information is taken from one dedicated disk surface, since the embedded servo information is more closely co-located with the targeted data information.

In a further effort to increase disk capacity, a proposed servo information format was developed, termed pre-embossed rigid magnetic (PERM) disk technology. As described and illustrated in Tanaka et al, *Characterization of Magnetizing Process for Pre-Embossed Servo Pattern of Plastic Hard Disks, I.E.E.E. Transactions on Magnetics* 4209 (Vol. 30, No. 2, November 1994), a PERM disk contains embossed servo information in a number of servo zones spaced radially about the disk. Each servo zone contains pre-embossed recesses and raised portions to form a fine pattern, clock mark, and address code. The fine pattern and address code are used to generate servo information signals. To generate these servo information signals, the magnetization direction of the raised portions and the recesses must be opposite. The magnetization process involves first magnetizing the entire disk in one direction using a high-field magnet. Then, a conventional write head is used to magnetize the raised areas in the opposite direction.

While use of a PERM disk may increase disk capacity, such an approach suffers from a number of shortcomings.

Servo information is provided on a PERM servo disk in a two-step magnetization process, as described above. This significantly increases the amount of time required to write servo information to the disk. Moreover, during the second step of the process, servo information is not yet available on the disk. Thus, an external positioning system must be employed, thereby increasing the cost of the servo writing process. Additional concerns associated with PERM disk technology include durability.

Finally, the PERM disk, like other embedded servo techniques, still stores servo information in disk space that could otherwise be used for data storage. As a result, PERM disk technology, although still at the research level, has not been widely accepted by industry.

Pre-embossed rigid thermal (PERT) disk technology uses the thermal response of a magnetoresistive (MR) head induced by servo information on a storage medium in order to position the MR head. As described in U.S. Pat. No. 5,739,972, issued Apr. 14, 1998 to Gordon J. Smith et al. and assigned to the assignee of the instant application, a PERT disk includes servo information provided to induce a thermal response in the MR head. The servo information is typically provided in the form of pre-embossed surface profile variations on the disk. A controller controls the relative position between the MR head and the embossed disk track using the thermal response induced in the MR head.

Typically in PERT disk technology, a read signal from an MR head is filtered to separate thermal and magnetic components. As disclosed in U.S. Pat. No. 6,088,176, issued Jul. 11, 2000 to Gordon J. Smith et al. and assigned to the assignee of the instant application, the thermal and magnetic components of a MR read signal are separated using a finite impulse response (FIR) filter. The thermal component is the thermal response of the MR head to the surface profile variations on the PERT disk. For the purpose of track following, for example, the surface profile variations may include serrated inner diameter (ID) and outer diameter (OD) track edges. For each track, the ID edge serration has a different serration frequency than the OD edge serration. By examining the frequency content of the thermal component of the read signal, the off-track direction and magnitude of the MR head can be determined and an appropriate control signal provided to the actuator to position the MR head over the centerline of a track. The frequencies may differ by a factor of two, for example, and alternate from track to track. Likewise, the serrations may be radially aligned, i.e., the serrations may be spaced further apart as one moves radially outward, as the serration frequencies relative to the MR head would be constant over the entire surface of the disk in a constant angular velocity system.

This two-frequency track serration arrangement provides improved track following without sacrificing data capacity of a disk. Unlike embedded servo techniques, this arrangement does not store servo information in disk space that could otherwise be used for data storage. However, the two-frequency track serration arrangement presents a number of disadvantages. The servo electronics required to examine the frequency content of the thermal component of the read signal and therefrom determine the off-track direction and magnitude of the MR head is relatively complex. In addition, PERT disks containing two-frequency track serrations are relatively difficult to manufacture. A similar two-frequency pit arrangement is disclosed in U.S. Pat. No. 5,251,082, issued Oct. 5, 1993 to Elliott et al. and suffers from analogous disadvantages. The Elliott et al. patent discloses the use of its two frequency pit arrangement to induce a magnetic read signal, i.e., no thermal component is utilized.

There exists in the data storage system manufacturing industry a need for an enhanced servo information format which is relatively easy to fabricate, and uses relatively simple servo electronics. The present invention addresses these and other needs.

SUMMARY OF THE INVENTION

The present invention is a method and apparatus for positioning a transducer relative to a storage medium in a storage device. The storage medium is moved relative to the transducer by a motor at a rated storage medium velocity. The storage medium has a plurality of tracks, each having a first edge and a second edge. The first edge and the second edge respectively comprise surface profile variations having a temporal frequency at the rated storage medium velocity. The surface profile variations of the first and second edges are phase modulated, i.e., have a phase difference relative to one another. First and second responses, e.g., thermal responses, are respectively induced in the transducer by the phase modulated surface profile variations of the first and second edges. The transducer may be positioned by a controller, for example, in response to at least one of the first and second thermal responses. A storage medium having phase modulated surface profile variations is relatively easy to fabricate. Moreover, relatively simple servo electronics can be used with the phase modulated surface profile variations.

DETAILED DESCRIPTION OF THE PREFERRED EMBODIMENTS

Figure 1:
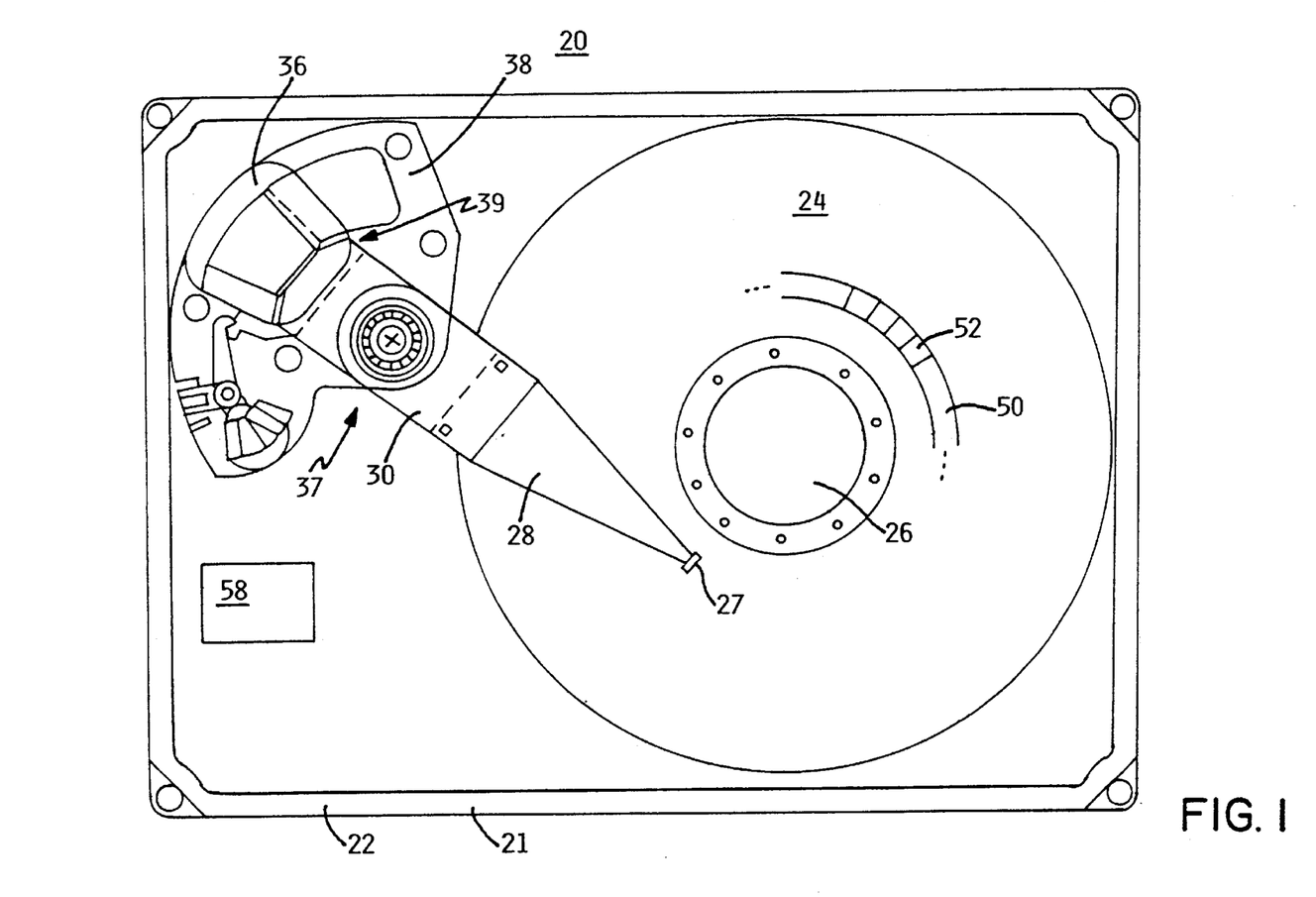
FIG. 1 is a top view of a data storage system with its upper housing cover removed.
Figure 2:
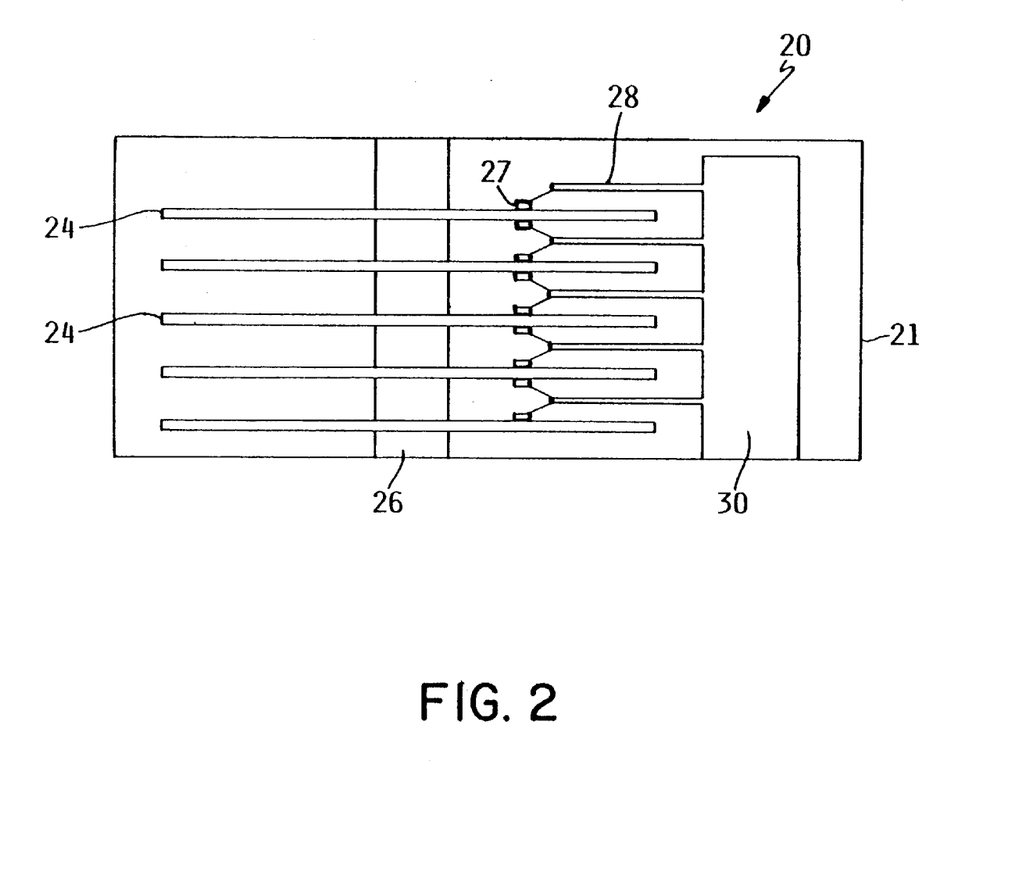
FIG. 2 is a side plan view of a data storage system comprising a plurality of data storage disks.

Referring now to the drawings, and more particularly to FIG. 1, there is shown a magnetic data storage system 20 with its cover (not shown) removed from the base 22 of the housing 21. The magnetic data storage system 20 typically includes one or more rigid data storage disks 24 which rotate about a spindle motor 26 as best seen in FIG. 2. The rigid data storage disks 24 are typically constructed with a metal, ceramic, glass or plastic substrate upon which a recording layer is formed. In one typical construction, a magnetizable recording layer is formed on an aluminum or ceramic substrate. In another typical construction, an aluminum optical recording layer is formed on a plastic substrate. Referring back to FIG. 1, an actuator assembly 37 typically includes a plurality of interleaved actuator arms 30, with each arm having one or more suspensions 28 and transducers 27. The transducers 27 typically include components both for reading and writing information to and from the data storage disks 24. Each transducer 27 may be, for example, a magnetoresistive (MR) head having a write element and a MR read element. Alternatively, each transducer may be an inductive head having a combined read/write element or separate read and write elements, or an optical head having separate or combined read and write elements. The actuator assembly 37 includes a coil assembly 36 which cooperates with a permanent magnet structure 38 to operate as an actuator voice coil motor (VCM) 39 responsive to control signals produced by controller 58. The controller 58 preferably includes control circuitry that coordinates the transfer of data to and from the data storage disks 24, and cooperates with the VCM 39 to move the actuator arms 30 and suspensions 28, to position transducers 27 to prescribed track 50 and sector 52 locations when reading and writing data from and to the disks 24.

Figure 3:
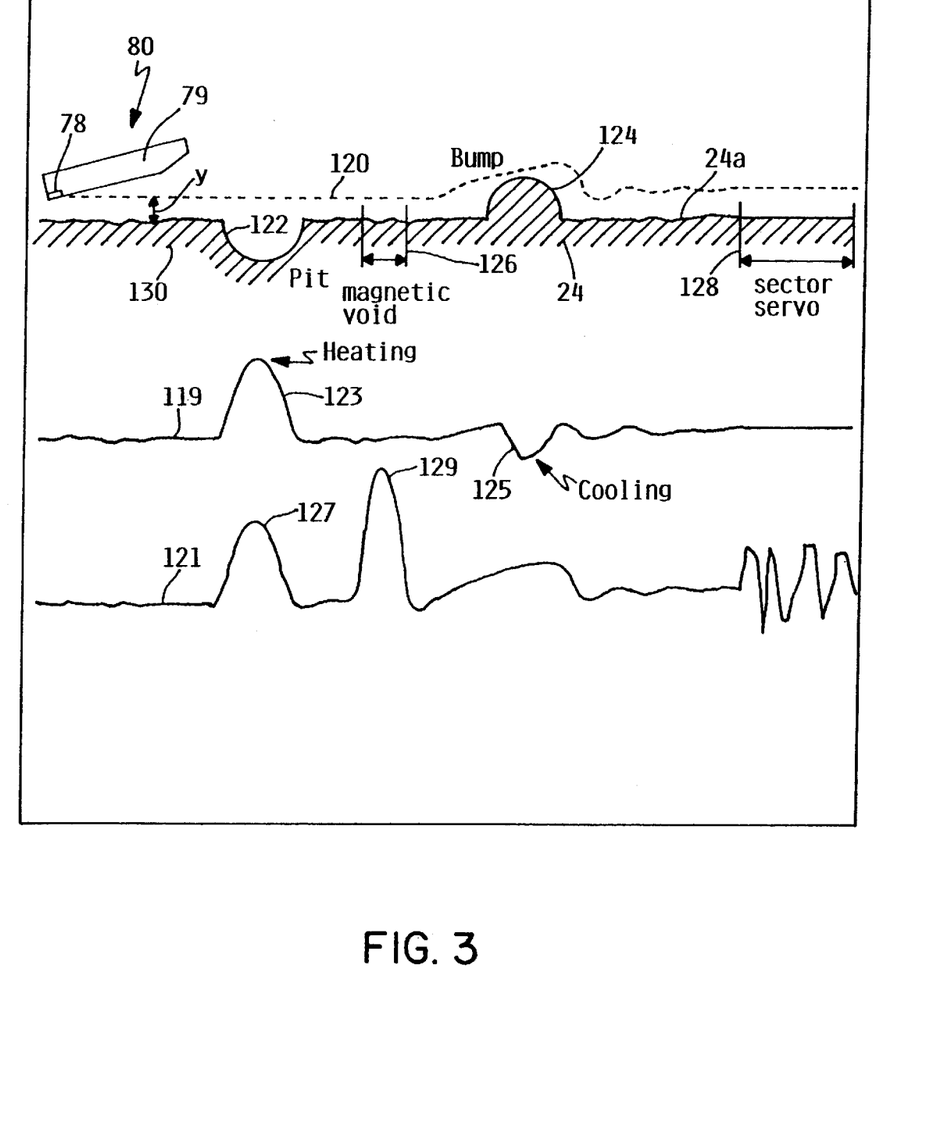
FIG. 3 is an exaggerated side view showing a data storage disk exhibiting various surface defects and features, and a thermal and magnetic response of an MR head to such defects and features.

In FIG. 3, there is illustrated an exaggerated side plan view of an MR head slider 79 flying in proximity with the surface 24a of a magnetic data storage disk 24. The disk surface 24a has a generally varying topography at the microscopic level, and often includes various surface defects, such as a pit 122, a bump 124, or a surface portion 126 void of magnetic material. It is known that the thermal response of an MR head 80 changes as a function of the spacing, denoted by the parameter (y), between an MR element 78 of the MR head 80 and the disk surface 24a. See, for example, U.S. Pat. No. 5,739,972, issued Apr. 14, 1998 to Gordon J. Smith et al. and assigned to the assignee of the instant application.

The present invention may optionally use such a thermal response. Alternatively, the present invention may use a magnetic response or an optical response, or a combination thereof, such as a combination of a thermal response and a magnetic response. In any event, the present invention is not limited to the use of a thermal response. For example, a magnetic response may be used within the scope of the invention instead of, or in combination with, a thermal response.

Head-to-disk spacing changes result in concomitant changes in heat transfer between the MR element 78 and disk 24. This heat transfer results in an alteration in the temperature of the MR element 78. Temperature changes to the MR element 78 result in corresponding changes in the electrical resistance of the MR element 78 and, therefore, the output voltage of the MR element 78.

As the instantaneous head-to-disk spacing (y) increases, there results a corresponding increase in the air space insulation between the MR head 80 and the disk surface 24a, thereby causing an increase in the temperature of the MR element 78. This temperature increase in the MR element 78 results in a corresponding increase in the MR element 78 resistance due to the positive temperature coefficient of the MR element material typically used to fabricate the MR element 78. Permalloy, for example, is a preferred material used to fabricate the MR element 78 and demonstrates a temperature coefficient of $+3 \times 10^{-3}/^\circ$ C. An MR head 80 passing over a bump 124 on the disk surface 24a, by way of example, results in increased heat transfer occurring between the MR element 78 and the disk surface 24a, thereby causing cooling of the MR element 78. Such cooling of the MR element 78 causes a decrease in the MR element 78 resistance which, in turn, results in a corresponding decrease in the voltage $V_{TH}$ across the MR element 78 at a constant bias current.

It can be seen by referring to the pit 122 depicted on the disk surface 24a that the thermal voltage signal $V_{TH}$ 119 across the MR element 78 increases in amplitude as a function of increasing head-to-disk separation distance (y). In can further be seen by referring to the bump 124 depicted on the disk surface 24a that the thermal voltage signal $V_{TH}$ 119 decreases in amplitude as a function of decreasing head-to-disk separation distance. The thermal signal component of the readback signal, therefore, is in fact an information signal that can be used to detect the presence and relative magnitude of topographical variations in the surface of a magnetic data storage disk 24.

Also shown in FIG. 3 is a magnetic spacing signal 121 which has been conditioned to correspond to variations in the disk surface 24a. For example, the negative logarithm of a magnetic signal obtained by passing the signal through a logarithmic device produces a magnetic spacing signal that is linearly related to the head-to-disk spacing. It can be seen that the magnetic spacing signal 121 incorrectly indicates the presence of some surface features, such as magnetic voids 126, as variations in the topography of the disk surface 24a. It can further be seen that the magnetic spacing signal 121 can provide an inferior indication of other surface features, such as bumps, when compared to disk surface imaging information provided by use of the thermal signal 119. Nevertheless, it may be desirable to use the magnetic response of a transducer to variations in the disk surface in the present invention in lieu of the thermal response or in combination with the thermal response.

As is well known in the art, the thermal component of an MR element readback signal may be extracted using conventional techniques to obtain information regarding the surface characteristics of the rotating disk 24. To provide a background, a brief discussion of a conventional technique that is well known in the art for extracting the thermal component is discussed below. Additional information regarding such conventional techniques may be found in, for example, U.S. Pat. No. 5,739,972, issued Apr. 14, 1998 to Gordon J. Smith et al. and assigned to the assignee of the instant application. Of course, other techniques of extracting the thermal component may be used within the scope of the invention. That is, the present invention is neither limited to the particular conventional technique for extracting a thermal component discussed below nor the details thereof.

Servo information is encoded in a surface profile of the disk 24 and is read using a transducer having an MR element, e.g., an MR head 80. Because the servo information is provided in the profile of the disk and can be read concurrently with magnetically stored data, an additional 15%–20% of the disk is made available to store data (i.e., the portion of the disk used to provide the traditional embedded magnetic servo information).

Figure 4:
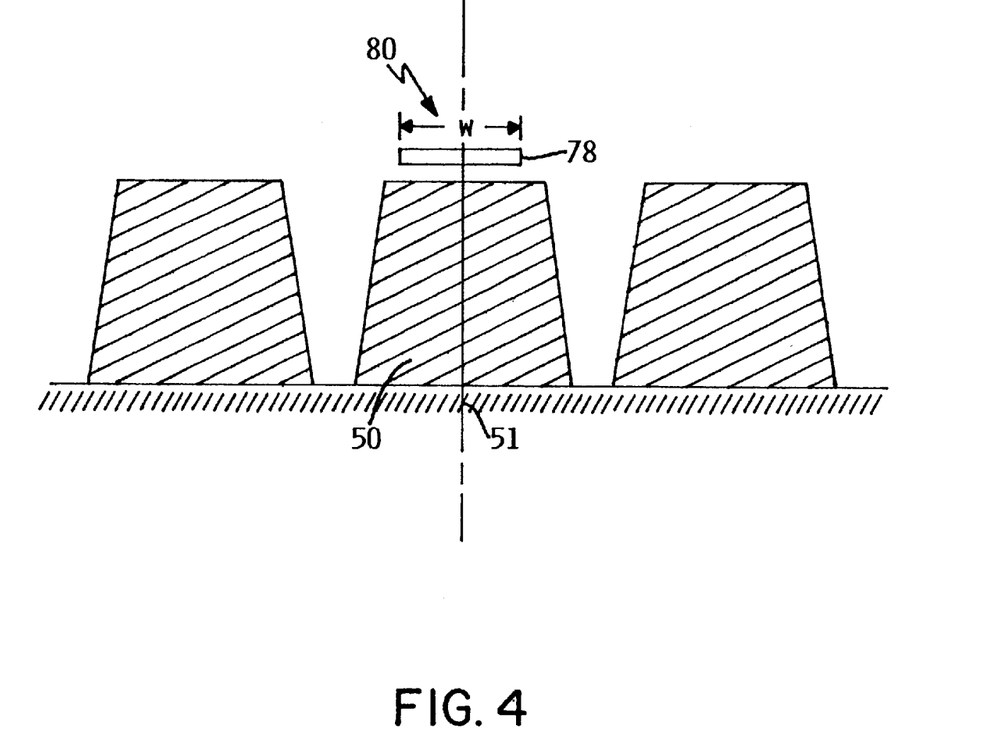
FIG. 4 is a cross-sectional view of a magnetoresistive element of a transducer in an on-track orientation over the centerline of a track of a disk.

Turning now to FIG. 4, there is shown a cross-section illustration of an MR element 78 of an MR head 80 oriented over the centerline 51 of a data track 50. The MR head 80 may be a type used in conventional data storage systems, thus promoting the employment of the present invention in conventional storage systems. As the MR element 78 passes over the track 50 of the surface 24a of rotating disk 24, magnetic transitions developed on the surface 24a of disk 24 result in the production of a readback signal induced in the MR head 80. By way of example and not limitation, the readback signal is preferably a voltage signal.

Figure 5:
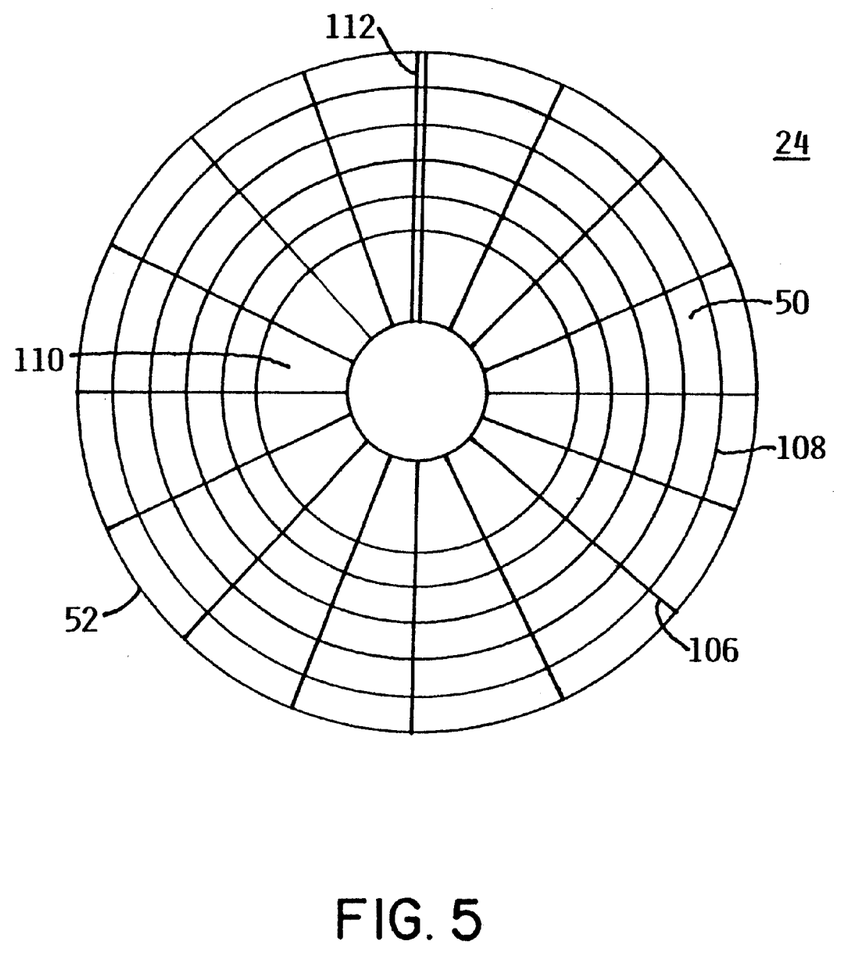
FIG. 5 is a top view of a disk having track markers, servo markers, a calibration zone and an index marker.

In FIG. 5, there is illustrated an exemplary disk 24 having pre-embossed track markers 108 and optional sector markers 106 for providing servo information on the disk 24 in the form of surface profile variations, e.g., head-to-disk spacing. The pre-embossed track markers 108 and the optional sector markers 106 may be formed using various techniques well known in the art, such as mask/photo lithographic, injection molding, stamping, laser-ablation, and sputtering techniques. The disk 24 is provided with concentric data tracks 50 used to store data. Alternatively, a non-concentric data track configuration, such as a spiral data track, may be used to store data. Each data track 50 may be partitioned into a series of sectors 52 that may be identified by the optional sector markers 106, for example. Alternatively, the sectors may be identified by conventional embedded magnetic servo information. Adjacent data tracks 50 are separated by track markers 108. The track markers 108, and optionally the sector markers 106, are formed as variations in the disk 24 which can be identified using either the thermal component or the magnetic component of the MR head readback signal.

Figure 6:
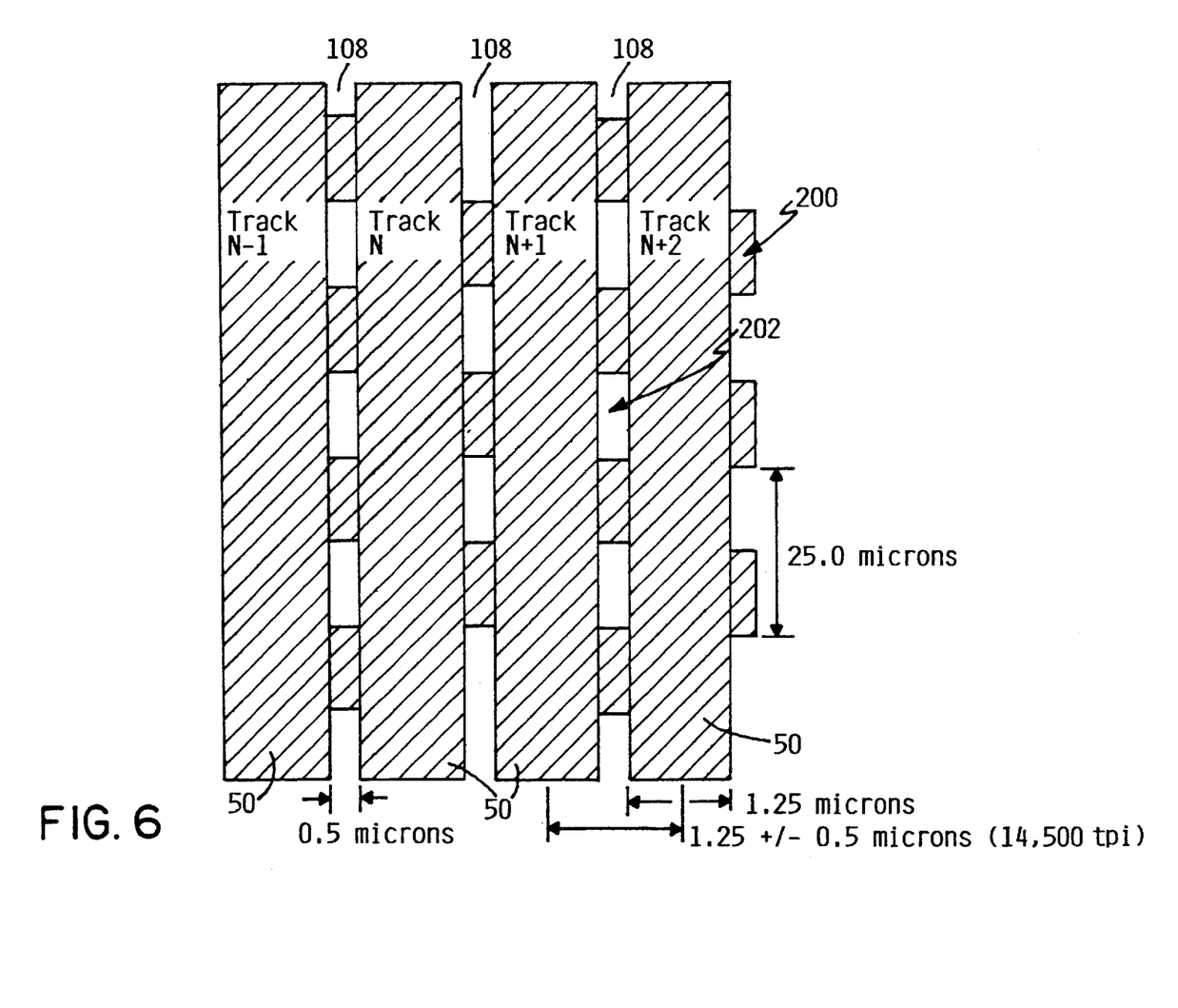
FIG. 6 is an enlarged top view of a portion of a disk having track markers that separate adjacent tracks according to a first embodiment of the present invention where the track markers are 180 degrees out-of-phase.
Figure 7:
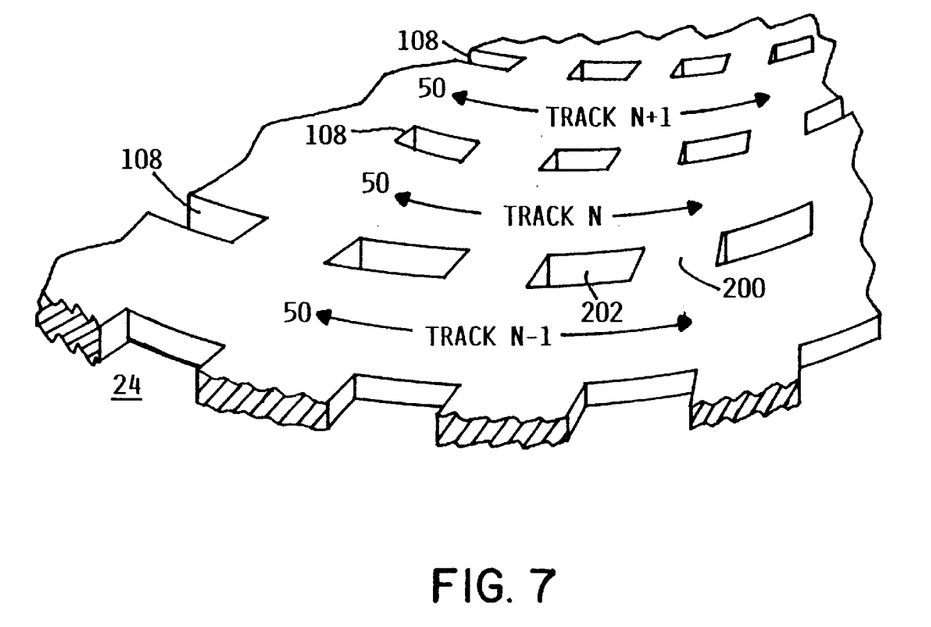
FIG. 7 is an enlarged perspective view of a portion of a disk having track markers that separate adjacent tracks according to the first embodiment of present invention.
Figure 8:
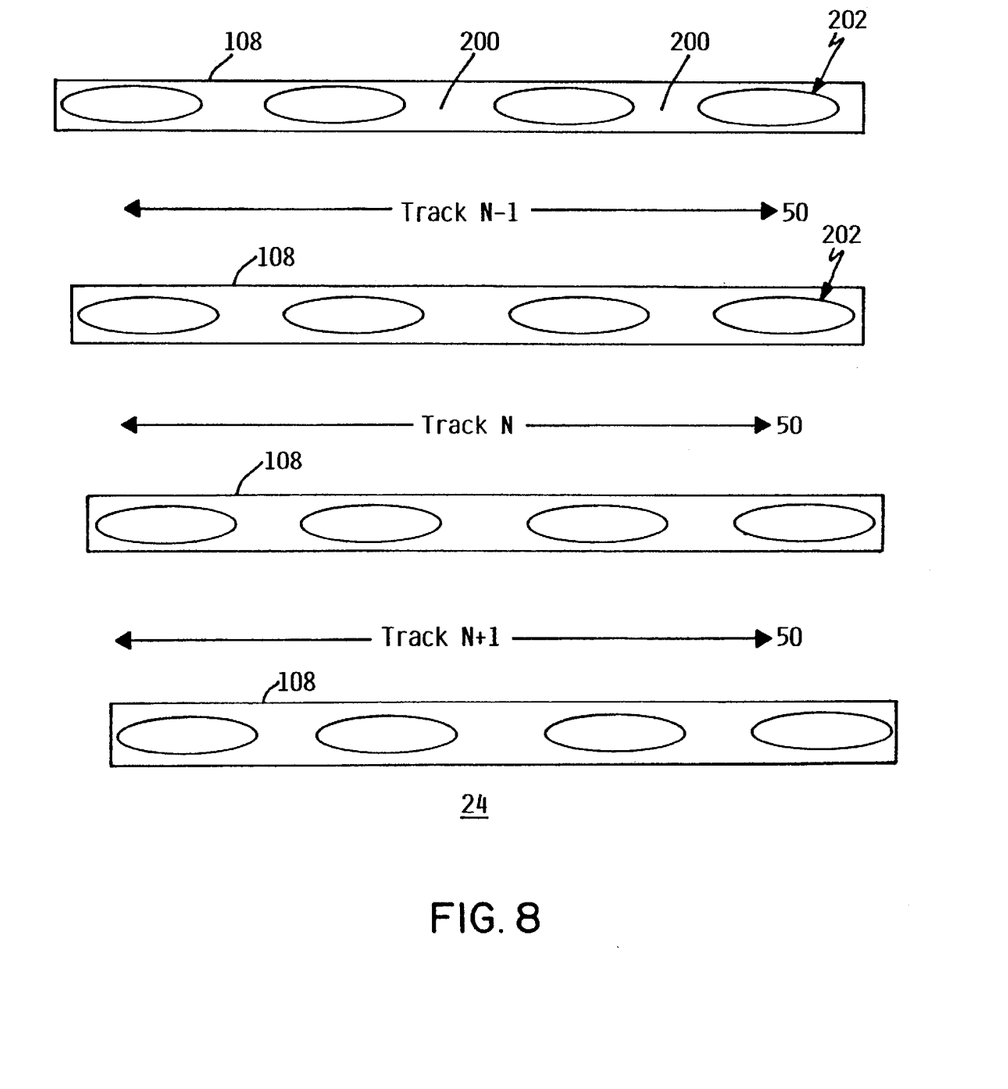
FIG. 8 is an enlarged top view of a portion of a disk having track markers that separate adjacent tracks according to an alternative embodiment the present invention where the track markers are 30 degrees out-of-phase.

As shown in FIGS. 6–8, the track markers 108 may be circumferential patterns of mesas 200 and valleys 202 providing head-to-disk spacing variations between adjacent data tracks 50. For the sake of simplicity, each of the track markers 108 is shown along a straight line in FIGS. 6 and 8, though each is actually curved circumferentially about disk 24 as shown in FIG. 7. As is discussed in detail below, the track markers 108 are used to provide track-following servo information. The mesas 200 are preferably the same height as the data tracks 50, while the valleys 202 are preferably pits formed in the surface 24a of the disk 24. Similarly, the optional sector markers 106 may be radial grooves providing head-to-disk spacing variations between adjacent sectors 52. As is conventional, the optional servo markers 106 may include Gray code patterns to give track, head, and sector location information. As is also conventional, the disk 24 may be provided with a calibration zone 110 and an index marker 112, which may be formed by a closely spaced pair of sector markers 106.

The track markers 108 have the same pattern frequency of surface profile variations, i.e., mesas 200 and valleys 202, on both sides of each track 50. Track position is determined by use of the phase modulation of the track markers 108. The track markers 108 are set up so that the phase of the thermal or magnetic signal due to the surface profile variations on one side of each track will be out of phase, preferably by 180 degrees, from that on the opposite side. That is, the inside diameter (ID) track marker pattern for a given track is phase modulated by 180 degrees relative to the outside diameter (OD) track marker pattern for that same track. Although the track markers 108 are preferably 180 degrees out of phase as shown in FIGS. 6 and 7, the track markers 108 may be out of phase by some other amount, e.g., 30 degrees as shown in FIG. 8. This out of phase amount, or phase difference, is generally equal to 360 degrees/N, where N is an integer.

The surface profile variations of track markers 108 shown in FIGS. 6–8 are in the form of mesas 200 and valleys 202. The mesas 200 are preferably the same height as the data tracks 50, while the valleys 202 are preferably pits formed in the surface 24a of the disk 24. Alternatively, the mesas 200 may be elevated portions formed on the surface 24a of the disk 24, while the valleys 202 are the same height as the data tracks 50. These elevated portions may be formed by sputtering, for example. In another alternative, the pattern of mesas 200 and valleys 202 for each track marker 108 may be formed in the surface 24a of the disk 24 as a serrated groove between adjacent tracks. In yet another alternative, the pattern of mesas 200 and valleys 202 may be formed on the surface 24a of the disk 24 as a serrated elevated ridge between adjacent tracks. However, in a typical environment, pits or grooves are preferred because they permit operation of the storage system 20 with minimal spacing between the MR heads and the data tracks. In addition, pits are typically preferred over grooves because pits are easier to form in the surface 24a of disk 24 than grooves.

In the embodiment shown in FIGS. 6 and 7 where adjacent track markers 108 are 180 degree out-of-phase, the valleys 202 of every other track marker 108 may be aligned radially, i.e., the valleys 202 may be longer and spaced further apart in the circumferential direction (mesas 200 are longer) as one moves radially outward. Similarly in the embodiment shown in FIG. 8 where adjacent track markers 108 are 30 degree out-of-phase, the valleys 202 of every twelfth track marker 108 may be aligned radially, i.e., the valleys 202 may be longer and spaced further apart in the circumferential direction (mesas 200 are longer) as one moves radially outward. This arrangement may be desirable in a constant angular velocity system, for example, as the surface profile variation frequency relative to the MR head 80 would be constant over the entire surface of the disk 24.

Servo information may also be derived from other variations in disk characteristics which can be reflected in the thermal component of the readback signal. These other variations are likewise referred to herein as surface profile variations. For example, the surface profile variations of the track markers 108 could differ in thermal emissivity or other parameters which can be reflected in the thermal component. Similar variations in disk characteristics can be used for the sector markers 106.

A storage medium having phase modulated surface profile variations is relatively easy to fabricate as compared to the conventional two-frequency arrangement which is more difficult to manufacture. For example, a storage medium having the conventional two-frequency arrangement often must be subjected to two fabrication steps that respectively incorporate the serrations having the two different frequencies. The second fabrication step inherently presents alignment issues relative to the first fabrication step. In contrast, a storage medium having phase modulated surface profile variations need only be subjected to a single fabrication step to form the all of the surface profile variations that make up the track markers, thereby eliminating any issue with alignment.

Moreover, because the track markers 108 do not have the conventional two-frequency arrangement, the servo position detection electronics can be made considerably simpler. This is possible because phase modulation as used in the present invention inherently has a higher signal-to-noise ratio than the amplitude detection scheme involved in the conventional two-frequency arrangement, which requires the detection of the amplitude of the two frequencies.

Because the rigid data storage disk 24 is pre-embossed, there are no erase bands and no issues with MR head position error signal (PES) non-linearity as in traditional embedded magnetic servo techniques. The PES based on phase modulation is inherently linear. In addition, because the disk 24 is pre-embossed, there is no frozen-in repeatable run out (RRO) caused during servo writing as in traditional embedded magnetic servo techniques. It is well known that this RRO contributes to non-repeatable run out (NRRO) and tracking errors in traditional embedded magnetic servo techniques.

Referring now to FIG. 6, by way of example and without limitation, dimensions for a 15,000 track-per-inch density are shown. For example, each track 50 has a width of 1.25 microns, while each track marker 108 has a width of 0.5 microns and a cycle pitch of 25.0 microns. The valleys 202 are shown as having a rectangular shape in FIGS. 6 and 7. However, the valleys 202 may be an alternative shape, such as elliptical as shown in FIG. 8. Typically, the surface profile variations of the disk 24 are shaped to induce a thermal response in the MR head 80 that is a square-wave signal. However, the surface profile variations of the disk 24 may be shaped to induce some other waveform, such as a sinusoidal-wave signal.

The frequency of the thermal signal caused by the repetitive heating and cooling of the MR head 80, respectively caused by the valleys 202 and the mesas 200, is the same on each side of the track 50. The phase of the thermal signal, however, is different on each side of the track 50. Thus by detecting the phase of the thermal signal, it can be determined whether a head has moved left or right of center on any track 50. Alternatively, the phase of the magnetic signal caused by valleys 202 and mesas 200 may be used for the same purpose. In another alternative, both the phase of the magnetic signal and the thermal signal may be used.

The frequency of the track marker pattern 108 as seen by thermal or magnetic sensing can be found by using the following equation:

$$F_p = \pi * R * RPM / (60 * p) \quad \{Eq.1\}$$

where: R is equal to the radius of the disk 24; RPM is the disk rotational speed in revolutions per minute; and p is the length of a mesa 200 plus a valley 202 in the circumferential direction, i.e., the spacial period or pitch. For example, if R=30.0 millimeters, RPM=10,000, and p=25.0 microns, then $F_p$=628 kHz. This frequency is within the detectable bandwidth for the thermal signal, as well as the magnetic signal.

Figure 9:
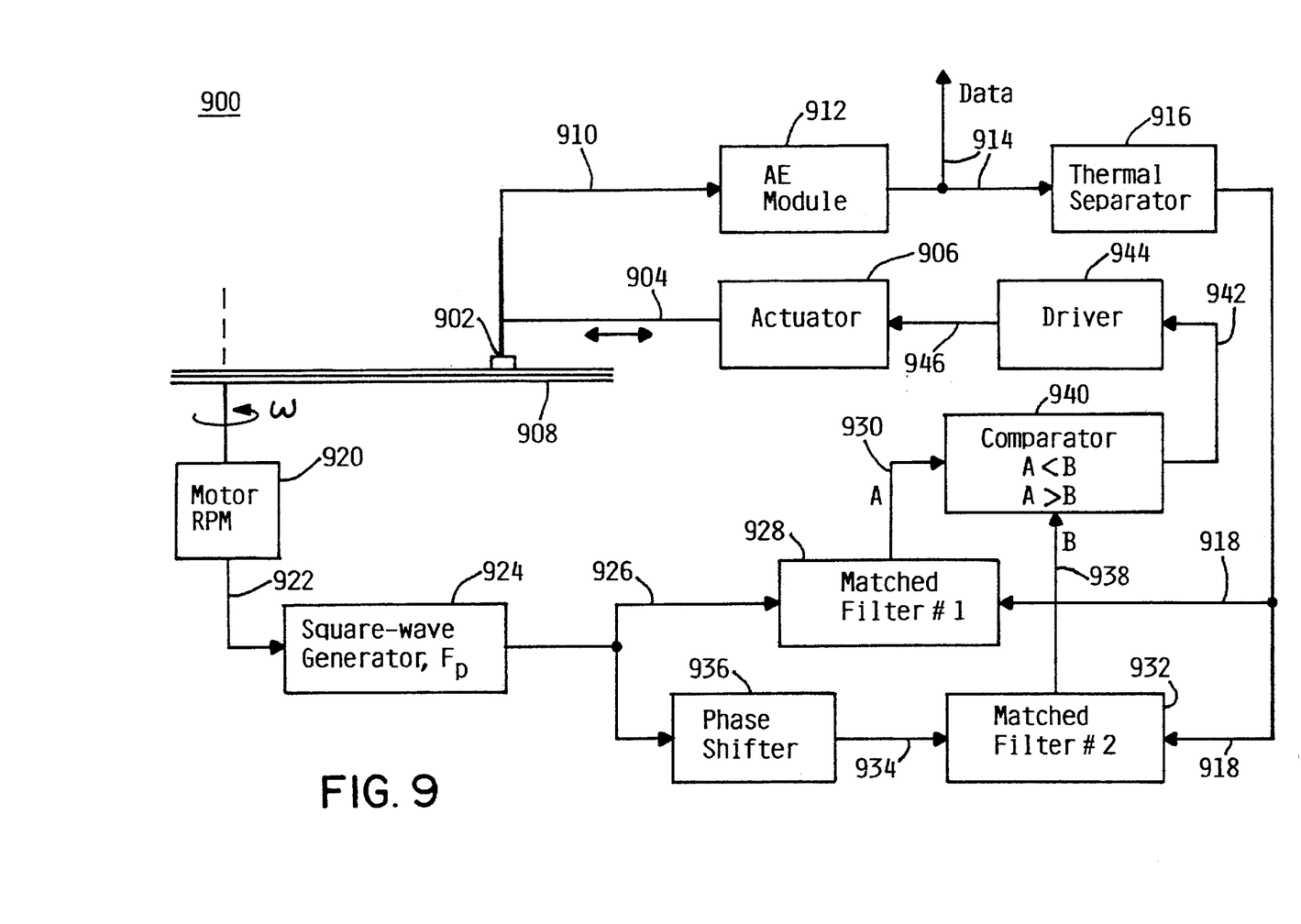
FIG. 9 is a block diagram of an embodiment of a phase modulated servo system according to the present invention.

A block diagram of an embodiment of a phase modulated servo system 900 is shown in FIG. 9. An MR head 902 is attached to a suspension 904, the motion of which is controlled by an actuator 906. The MR head 902 flies over one surface of a rotating disk 908. A readback signal 910 from the MR element of MR head 902 consists of both a magnetic component of high frequency content and a thermal component of low frequency content. The combined signal, i.e., the readback signal 910, is amplified in an arm electronics (AE) module 912. The amplified output from AE module is sampled by a sampler (not shown) at a sampling rate to produce a sampled readback signal 914. A typical sampling rate will be in excess of 100 megahertz (MHz). The sampled readback signal 914 is input to the recording channel (not shown) for normal processing and a thermal separator 916.

The thermal separator 916, which acts as a sophisticated lowpass filter extracts and provides a thermal signal 918. As is well known in the art, the thermal component of an MR element readback signal, such as the readback signal 910, may be extracted using conventional techniques to obtain information regarding the surface characteristics of a record medium, such as the rotating disk 908. Such conventional techniques may be found in, for example, U.S. Pat. No. 5,739,972, issued Apr. 14, 1998 to Gordon J. Smith et al. and assigned to the assignee of the instant application.

In one such conventional thermal signal extraction technique, the sampled readback signal is provided to a first filter, e.g., an inverse infinite impulse response (IIR) filter, to compensate for the high pass filter in the AE module. The output of the first filter is passed through a second filter, e.g., a moving average low-pass finite infinite response (FIR) filter, to recover the thermal component of the sampled readback signal. Typically the FIR filter averages over several samples to provide a moving average. The output of the second filter may optionally be passed through a third filter, e.g., an adaptive inverse filter, to restore the distorted thermal component during a write operation to that which would be present during read operation. That is, the write element-to-MR element heat transfer during the write operation distorts the thermal component of the readback signal. The dynamics of the write element-to-MR element heat transfer may be approximated by a first order lowpass filter transfer function. The distortion caused by the write element-to-MR element heat transfer may be substantially reduced by passing the signal leaving the second filter through the adaptive inverse filter having a transfer function inverse to that of the lowpass filter transfer function.

Use of the third filter, i.e., the adaptive inverse filter, is advantageous because it permits the MR element to thermally detect the track markers even while the write element is writing. This in turn permits a nearly real-time write-inhibit feature, wherein the write element is prevented from writing before the MR head is off-track by an amount sufficient to cause data loss. Such an off-track condition is detected almost instantaneously by continuous track following, which is made possible through the use of the track markers. This is advantageous over traditional embedded magnetic servo techniques, in which the off-track condition is detected significantly later, i.e., when the next servo sector is encountered.

Thus, in this conventional thermal signal extraction technique, the thermal separator includes an inverse IIR filter, a FIR filter and an optional adaptive inverse filter. Of course, other techniques of extracting the thermal component may be used within the scope of the invention. That is, the present invention is neither limited to this particular conventional technique for extracting a thermal component nor the details thereof.

The disk 908 is spun by spindle motor 920. A synchronization signal 922 provided by the spindle motor 920 is used by a binary square-wave generator 924 of frequency $F_p$, i.e., the frequency of the track marker pattern. A square-wave signal 926 from binary square-wave generator 924 is one of two inputs to a first matched filter 928. The other input to first matched filter 928 is thermal signal 918, which is multiplied by the square-wave signal 926 and summed periodically to provide an output A on line 930.

A second matched filter 932 also receives two inputs. One input to second matched filter 932 is a phase-shifted square-wave signal 934 provided by a phase shifter 936, which delays the square-wave signal 926. The phase shifter 936 becomes an inverter if the track marker patterns are 180 degrees out-of-phase, i.e., the inside diameter (ID) track marker pattern for a given track is phase modulated by 180 degrees relative to its outside diameter (OD) track marker pattern. Alternatively, a phase-shifted square-wave signal may be used in lieu of the inverted square-wave if the track marker patterns are other than 180 degrees out-of-phase. For example, such a phase-shifted square-wave may be produced using a delay module to introduce a time delay into the square-wave 934. The time delay would correspond to the out-of-phase amount of the track markers. The other input to second matched filter 932 is thermal signal 918, which is multiplied by the phase-shifted square-wave signal 934 and summed periodically to provide an output B on line 938.

In essence, when the square-wave signal 926 and the thermal signal 918 substantially agree or align, e.g., when the timing of the rise and/or fall of these signals correspond, the output A becomes maximum and the output B becomes minimum. This occurs when the MR head 902 is over the track marker at one edge of the track, e.g., the ID track marker. On the other hand, when the phase-shifted square-wave signal 936 and the thermal signal 918 substantially agree or align, e.g., when the timing of the rise and/or fall of these signals correspond, the output B becomes maximum and the output A becomes minimum. This occurs when the MR head 902 is over the track marker at the other edge of the track, e.g., the OD track marker.

In an alternative embodiment, the square-wave generator 924 may be replaced with a wave generator that generates a wave signal that is not a square-wave signal. For example, a sinusoidal-wave generator may be used in lieu of the square-wave generator 924. As a result, a sinusoidal-wave signal would be generated rather than the square-wave signal 926. A sinusoidal-wave signal generator would be preferred, for example, in a case where the surface profile variations of disk 24 are shaped to induce a sinusoidal-wave signal in the MR head 902.

In another alternative embodiment, a magnetic spacing signal may be used instead of the thermal signal 918. For example, the sampled readback signal 914 may be passed through a logarithmic device in lieu of thermal separator 916 to produce a magnetic spacing signal that is linearly related to the head-to-disk spacing. The remainder of the phase modulated servo system 900 would remain unchanged in this alternative embodiment. In a further modification, it may be desirable to employ a both the magnetic response and the thermal response to the surface profile variations. For example, the thermal signal 918 obtained from the thermal separator 916 may be verified or calibrated using the magnetic spacing signal obtained from a log device.

The outputs A and B from the two matched filters 928, 932 serve as inputs to a comparator 940. The comparator 940, which may be an operational amplifier, for example, produces a position error signal (PES) on a line 942 based on these outputs A and B. That is, comparator 940 produces a proportional (e.g., varies in amplitude based on the difference between outputs A and B) positive signal on a line 942 if the output A from the first matched filter 928 is larger than the output B from the second matched filter 932 (A>B). On the other hand, the comparator 940 produces a proportional (e.g., varies in amplitude based on the difference between outputs A and B) negative signal on the line 942 if the output A from the first matched filter 928 is less than the output B second matched filter 932 (A<B). In other words, the position error signal indicates the off-track direction and magnitude of the MR head 902 relative to the center of a track.

The position error signal from comparator 940 serves as an input to an actuator driver 944. The actuator driver 944 uses the position error signal to provide an appropriate actuator control signal 946 to the actuator 906 to position the MR head 902 over the centerline of the track. For example, the actuator driver 944 may serve as a bipolar pulse-width-modulator (PWM) to provide an actuator control signal 946 to the actuator 906 that positions MR head 902 over the center of a track, i.e., centered between adjacent track markers. Alternatively, the actuator driver 944 may serve as a simpler bang—bang driver, i.e., bipolar pulse amplitudes are fixed in amplitude and width but vary in polarity, for providing the actuator control signal 946 to the actuator 906 to position MR head 902 over the center of a track. In other words, the bang—bang driver provides small pulses that slowly move the actuator one way or another.

In an alternative embodiment, the comparator 940 may produce a digital position error signal, in which case a digital to analog (DAC) converter (not shown) may be used to convert the digital position error signal to an analog signal for use by actuator driver 944.

Together, comparator 940, first matched filter 928 and second matched filter 932 are referred to herein as a controller. These components of the controller are preferably fabricated on a single chip, which may also contain additional components such as the actuator driver 944, phase shifter 936, square-wave generator 924 and/or thermal separator 916. Alternatively, various components of the controller may be fabricated on separate chips, e.g., the first matched filter 928 and the second matched filter 932 may be fabricated on a single chip that is separate from another chip on which the comparator 940 is fabricated.

Equation 1 may be rearranged to solve for the pitch p of the track marker pattern.

$$p = \pi * R * RPM/(60 * F_p) \quad \{Eq.2\}$$

For illustration and without limitation, assume that the frequency $F_p$ of the track marker pattern is 1.0 MHz and the desired servo bandwidth for the actuator track-positioning control is 1.0 kHz. From Equation 2, this would correspond to a pitch of p=16 microns at a disk radius of R=30.0 millimeters and a rotational velocity RPM=10,000, for example. The first and second matched filters 928, 932 could be summed over 10 pitch cycles of the track marker pattern, for example, to yield a proportional positive/negative control signal 942 having frequency of $F_p/10=100$ kHz.

While this invention has been described with respect to the preferred and alternative embodiments, it will be understood by those skilled in the art that various changes in detail may be made therein without departing from the spirit, scope, and teaching of the invention. For example, the invention may be utilized in systems employing optical storage medium. Accordingly, the herein disclosed invention is to be limited only as specified in the following claims.

What is claimed is:

1. A storage device, comprising:

a storage medium;

a transducer;

an actuator provided to move said transducer relative to said storage medium;

a motor provided to move said storage medium relative to said transducer at a rated storage medium velocity;

said storage medium comprising a plurality of tracks having a flat bottom surface, each of the plurality of tracks having a first edge and a second edge, said first edge and said second edge each comprise surface profile variations having a frequency at said rated storage medium velocity, said surface profile variations of said first edge having a phase difference relative to said surface profile variations of said second edge;

a controller coupled to said actuator and provided to control movement of said transducer relative to said storage medium based on a response of said transducer to said surface profile variations of at least one of said first and second edges;

a wave generator coupled to said motor to receive a synchronization signal and coupled to said controller, said wave generator generating a wave signal based on said synchronization signal; and an inverter coupled to said wave generator to receive said waive signal, said inverter generating an inverted wave signal based on said wave signal;

wherein said transducer is a magnetoresistive (MR) head, said frequency of said surface profile variations of said first edge at said rated storage medium velocity and said frequency of said surface profile variations of said second edge at said rated storage medium velocity being equivalent and falling within a frequency range associated with a thermal response of said MR head.

2. The storage device as recited in claim 1, wherein said controller comprises:

a first matched filter coupled to said wave generator to receive said wave signal and coupled to said MR head to receive said thermal response, said first matched filter generating an output A based on said wave signal and said thermal response;

a second matched filter coupled to said inverter to receive said inverted wave signal and coupled to said MR head to receive said thermal response, said second matched filter generating an output B based on said inverted wave signal and said thermal response;

a comparator coupled to said first and second matched filters to receive said outputs A and B, said comparator generating a position error signal (PES) based on a comparison of said outputs A and B.

3. A method of positioning a transducer relative to a storage medium in a storage device, the storage device having a motor for moving the storage medium relative to the transducer at a rated storage medium velocity, the storage medium comprising a plurality of tracks having a flat bottom surface, each of the plurality of tracks having a first edge and a second edge, the first edge and the second edge each comprise surface profile variations having a frequency at the rated storage medium velocity, the method comprising the steps of:

inducing a first response in the transducer when the transducer is positioned over the surface profile variations of the first edge;

inducing a second response in the transducer when the transducer is positioned over the surface profile variations of the second edge, said first and second responses respectively having a phase difference relative to one another;

moving the transducer based on at least one of said first and second responses, wherein the step of moving the transducer comprises the steps of:

generating a first wave signal based on a synchronization signal from the generating a second wave signal based on said first wave signal;

generating an output A based on said first wave signal and at least one of said first and second responses from the transducer;

generating an output B based on said second wave signal and at least one of said first and second responses from the transducer;

generating a position error signal (PES) based on a comparison of said outputs A and B.

4. The method as recited in claim 3, wherein the transducer is a magnetoresistive (MR) head, the frequency of the surface profile variations of the first edge at the rated storage medium velocity and the frequency of the surface profile variations of the second edge at the rated storage medium velocity being equivalent and falling within a frequency range associated with a thermal response of said MR head.

* * * * *

UNITED STATES PATENT AND TRADEMARK OFFICE
CERTIFICATE OF CORRECTION

PATENT NO. : 6,657,809 B2
DATED : December 2, 2003
INVENTOR(S) : Hal Hjalmar Ottesen and Gordon James Smith It is certified that error appears in the above-identified patent and that said Letters Patent is hereby corrected as shown below:

<u>Column 14,</u>
Line 17, after "the" insert -- motor; --

Signed and Sealed this

Sixth Day of April, 2004

JON W. DUDAS
*Acting Director of the United States Patent and Trademark Office*